(12) United States Patent
Yuasa et al.

(10) Patent No.: US 8,158,547 B2
(45) Date of Patent: Apr. 17, 2012

(54) ABSORBENT

(75) Inventors: Akiko Yuasa, Kyoto (JP); Yasushige Kuroda, Okayama (JP); Mahiko Nagao, Okayama (JP); Atsushi Itadani, Okayama (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/919,401

(22) PCT Filed: Apr. 26, 2006

(86) PCT No.: PCT/JP2006/308761
§ 371 (c)(1),
(2), (4) Date: Dec. 19, 2007

(87) PCT Pub. No.: WO2006/118154
PCT Pub. Date: Nov. 9, 2006

(65) Prior Publication Data
US 2009/0274617 A1    Nov. 5, 2009

(30) Foreign Application Priority Data

Apr. 27, 2005   (JP) ................. 2005-129207

(51) Int. Cl.
*B01J 29/06* (2006.01)
*B01J 20/00* (2006.01)
(52) U.S. Cl. ........... 502/71; 502/407; 502/414; 423/713
(58) Field of Classification Search ........... 423/700, 423/714, 717
See application file for complete search history.

(56) References Cited

U.S. PATENT DOCUMENTS

| | | | | |
|---|---|---|---|---|
| 5,908,806 A | * | 6/1999 | Kharas | ............... 502/64 |
| 6,046,128 A | | 4/2000 | Kisen et al. | |
| 2005/0284795 A1 | | 12/2005 | Hansen et al. | |

FOREIGN PATENT DOCUMENTS

| | | |
|---|---|---|
| EP | 0 186 398 | 7/1986 |
| EP | 0 888 817 | 1/1999 |
| JP | 2003-311148 | 11/2003 |
| JP | 2005-15267 | 1/2005 |
| JP | 2005-21891 | 1/2005 |
| WO | 2004/002623 | 1/2004 |

OTHER PUBLICATIONS

Kuroda et al, Phy. Chem. Chem. Phys, 2001, 3, 1383-1390.*
English translation of Office Action issued Jun. 12, 2009 in the Chinese application corresponding to present U.S. application.
English translation of Shi Qihong et al., "Preparation and Characterization of a New Type of Bifunctional Cu(I)/Zeolite Carbonylation Catalyst", Chinese Journal of Catalysis, vol. 20, No. 2, pp. 125-128, Mar. 19999.

(Continued)

*Primary Examiner* — Melvin Mayes
*Assistant Examiner* — Bijay Saha
(74) *Attorney, Agent, or Firm* — Wenderoth, Lind & Ponack, L.L.P.

(57) ABSTRACT

An absorbent of ZSM-5 zeolite ion-exchanged with copper ion, characterized in that at least 60% or more of the copper sites in the copper ion-exchanged ZSM-5 zeolite are copper (I) sites and preferably at least 70% or more of the copper (I) sites are three-oxygen-coordinated copper (I) sites.

2 Claims, 2 Drawing Sheets

OTHER PUBLICATIONS

Yasushige Kuroda et al., "Anomalous valence changes and specific dinitrogen adsorption features of copper ion exchanged in ZSM-5 zeolite prepared from an aqueous solution of $[Cu(NH_3)_2,]^{+}$", Phys. Chem. Chem. Phys., 6, pp. 2534-2541, 2004.

English translation of International Preliminary Report on Patentability dated Apr. 24, 2008 in the International (PCT) Application PCT/JP2006/308761 of which the present application is the U.S. National Stage.

Extended European Search Report issued Aug. 31, 2009 in a European Application No. EP 06 73 2367, which is a foreign counterpart of the present application.

Kuroda, et al. "Characterization of cuprous ion in high silica zeolites and reaction mechanisms of catalytic NO decomposition and specific $N_2$ adsorption", Topics in Catalysis, vol. 28, Nos. 1-4, Apr. 2004, pp. 111-118.

Kuroda, et al. "A more efficient copper-ion-exchanged ZSM-5 zeolite for $N_2$ adsorption at room temperature: Ion-exchange in an aqueous solution of $Cu(CH_3COO)_2$,", Physical Chemistry Chemical Physics (online), vol. 3, No. 7, Feb. 27, 2001, pp. 1383-1390, XP-002541890.

Recchia, et al., "Dinitrogen Irreversible Adsorption on Overexchanged Cu-ZSM-5", J. Phys. Chem, vol. 106, No. 51, Jun. 11, 2002, pp. 13326-13332, XP-002541892.

International Search Report issued May 23, 2006 in the International (PCT) Application of PCT/JP2006/308761 which the present application is the U.S. National Stage.

Takae Okamoto et al., "Do Ion Kokan Zeolite Shiryochu no Ion Kokan Site to Chisso Kyuchaku Tokusei", Dai 88 Kai Shokubai Toronkai Toronkai A Yokoshu, Catalysis Society of Japan, 20, p. 293, Sep. 20, 2001.

Atsushi Itadani et al., "Ion Kokan Yoekichu ni Fukumareru Carboxylate ni yoru CuZSM-5 Jo deno Shitsuon ni Okeru N2 Kyuchaku no Koritsuka", Dai 92 Kai Shokubai Toronkai Toronkai A Yokoshu, Catalysis Society of Japan, p. 314, Sep. 18, 2003.

Atsushi Itadani et al., "Do Ion Kokan Zeolite no Kokan Jotai ni Oyobosu Kokan Yoekichu no Haiishi Koka", CSJ: The Chemical Society of Japan Dai 81 Kai Shunki Nenkai Koen Yokoshu I, CSJ: The Chemical Society of Japan, p. 116, Mar. 11, 2002.

* cited by examiner

ABSORBENT

TECHNICAL FIELD

The present invention relates to an absorbent.

BACKGROUND ART

Gas absorbents have been used in various fields, for example, for preservation of vacuum, removal of a trace amount of gas in rare gas, and removal of gas in fluorescent lamp.

As for rare gases used in semiconductor production industry, there is a demand for purification of the rare gases by removal of nitrogen, hydrocarbon, carbon monoxide, carbon dioxide, oxygen, hydrogen, steam and the like contained in the rare gases. In particular, it is quite difficult to remove nitrogen, the most stable molecule among them, at around room temperature.

An example of the material for removal of nitrogen or hydrocarbons contained in rare gas is a getter material of a ternary alloy of zirconium, vanadium and tungsten (see, for example, Patent Document 1).

The ternary alloy removes a trace amount of impurities such as nitrogen contained in rare gas at a temperature of 100 to 600° C., when brought into contact with the rare gas.

Non-vaporizing getter alloys having a high gas absorption capacity to nitrogen include alloys containing zirconium, iron, manganese, yttrium or lanthanum, and a rare earth element (see, for example, Patent Document 2).

The non-vaporizing getter alloy having a high gas absorption capacity to nitrogen becomes active at room temperature to gases such as hydrogen, hydrocarbon and nitrogen etc., when activated at a temperature of 300 to 500° C. for 10 to 20 minutes.

Alternatively, alloys used for removal of nitrogen at low temperature include Ba—Li alloys (see, for example, Patent Document 3).

The Ba—Li alloy is used as a device for preserving vacuum together with a drying agent in an insulated jacket and shows reactivity to gases such as nitrogen at room temperature.

Alternatively, an absorbent of copper ion-exchanged ZMS-5 zeolite is known as a material for removal of impurities such as nitrogen contained in a gas to be purified (see, for example, Patent Document 4).

It is produced by introducing copper ion into a ZMS-5 zeolite and heat-treating the zeolite by a conventional ion exchange method for nitrogen absorption activity, and the maximum nitrogen absorption capacity at an equilibrium pressure of 10 Pa is reported to be 0.238 mol/kg (5.33 cc/g).

Patent Document 1: Japanese Unexamined Patent Publication No. 6-135707
Patent Document 2: Japanese Unexamined Patent Publication No. 2003-535218
Patent Document 3: Japanese Unexamined Patent Publication No. 9-512088
Patent Document 4: Japanese Unexamined Patent Publication No. 2003-311148

DISCLOSURE OF INVENTION

Technical Problems to be Solved

However, the absorbent described in Patent Document 1 is required to be heated continuously at 300 to 500° C.; the heating at high temperature demands high energy cost and is not friendly to the environment; and thus, such a method could not be used when gas absorption at low temperature is desirable.

The absorbent described in Patent Document 2 demands pretreatment at 300 to 500° C., and it is difficult to remove gas at normal temperature, when such pretreatment at high temperature is impossible, for example when a gas in a plastic bag is to be removed.

The absorbent described in Patent Document 3 does not demand heat treatment for activation and allows nitrogen absorption at room temperature, but undesirably reacts with water, nitrogen, and the like in air during handling. Because such a reaction is an irreversible reaction, it is necessary to make the absorbent retain its initial activity until the date of use, and thus, care should be give to handling of the absorbent. Along with increasing need for further scale up of nitrogen absorption capacity, and because barium is a substance designated in PRTR, there is a need for a new industrial absorbent safer to environments and human.

The absorbent described in Patent Document 4 allows gas absorption, for example of nitrogen, at room temperature, but there is a need for an absorbent allowing large-volume gas absorption.

An object of the present invention is to provide a copper ion-exchanged ZSM-5 zeolite that could solve the traditional problems above and that has a higher gas absorption capacity, in particular a higher nitrogen absorption capacity, and thus, to allow large-capacity gas absorption at normal temperature and normal pressure or at normal temperature under reduced pressure.

Means to Solve the Problems

The absorbent according to the present invention is an absorbent of ZSM-5 zeolite ion-exchanged with copper ion, wherein at least 60% or more of the copper sites in the copper ion-exchanged ZSM-5 zeolite are copper (I) sites, so that the object above can be achieved.

Preferably, at least 70% or more of the copper (I) sites are three-oxygen-coordinated copper (I) sites.

The copper (I) sites, in particular the three-oxygen-coordinated copper (I) sites, are active sites for absorption of nitrogen and other gases, and a high rate of these sites makes it possible to absorb large-volume of gas.

Effect of Invention

Because at least 60% or more of the copper sites in the copper ion-exchanged ZSM-5 zeolite are copper (I) sites, the absorbent according to the present invention can absorb and immobilize gases in a greater amount than conventional absorbents. It is also possible to perform stronger gas absorption, when at least 70% or more of the copper (I) sites are three-oxygen-coordinated copper (I) sites.

BEST MODE FOR CARRYING OUT THE INVENTION

Figure 1:
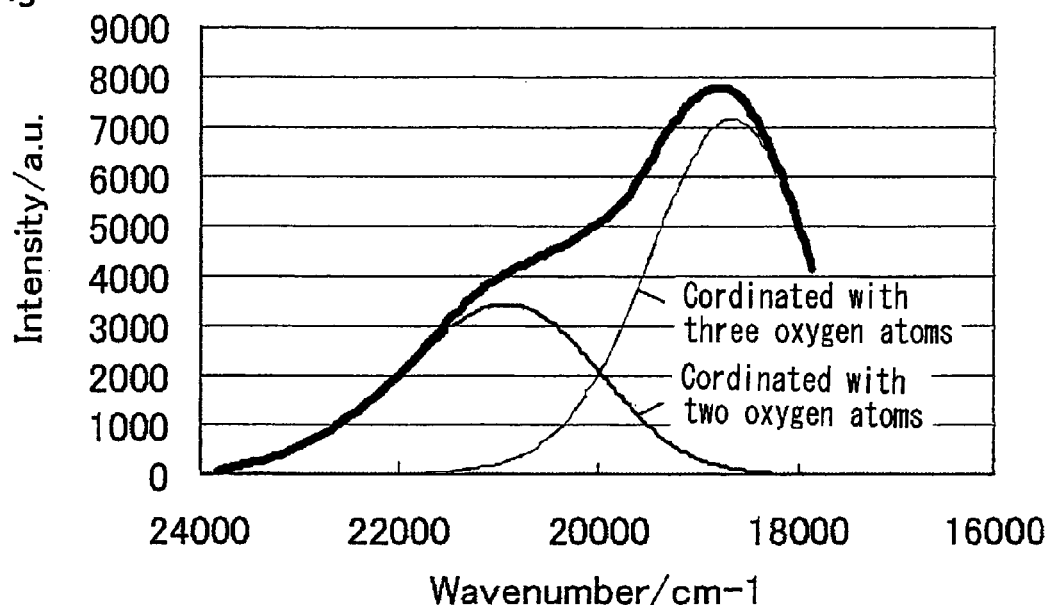
FIG. 1 is a diagram showing the copper (I) emission spectrum of an absorbent according to the present invention.

The first absorbent according to the invention is an absorbent of ZSM-5 zeolite ion-exchanged with copper ion, characterized in that at least 60% or more of the copper sites in the copper ion-exchanged ZSM-5 zeolite are copper (I) sites.

Copper ion-exchanged ZSM-5 zeolites have been known to absorb nitrogen chemically. Copper ion-exchanged ZSM-5 zeolites so far reported were produced by ion-exchange with an aqueous solution of a soluble copper salt such as aqueous copper chloride solution, aqueous copper amino acid solution, or aqueous copper acetate solution, and subsequent reduction of the copper ion to monovalent copper ion by heat treatment of the resulting zeolite for the purpose of providing it with nitrogen absorption activity.

However, the copper ion-exchanged ZSM-5 zeolite has several kinds of copper ion exchange sites, and, in copper ion-exchanged ZSM-5 zeolites prepared by the conventional known method, there is a limit in increasing the rate of the nitrogen absorption active copper (I) sites among the copper sites, and the conventional maximum rate was approximately 50%.

Presence of at least 60% or more copper sites in the absorbent according to the present invention as absorption active copper (I) sites leads to increase in gas absorbing capacity and also allows absorption not only of nitrogen and carbon monoxide but also of other gas species such as hydrogen and oxygen.

The rate of the copper (I) sites among the copper sites in the copper ion-exchanged copper sites is calculated by determining the molar amount of the carbon monoxide absorbed by the copper ion-exchanged ZSM-5 zeolite to the total molar amount of the copper in the copper ion-exchanged ZSM-5 zeolite.

The total molar amount of the copper in the copper ion-exchanged ZSM-5 zeolite can be determined by dissolving the copper ion-exchanged ZSM-5 zeolite, for example, in perchloric acid and analyzing the copper concentration of the solution, for example, by EDTA titration.

The second absorbent according to the present invention is characterized in that at least 70% or more of the copper (I) sites in the first absorbent are three-oxygen-coordinated copper (I) sites.

It has been revealed that among the copper (I) sites, the three-oxygen-coordinated copper (I) sites have stronger interaction with gaseous molecules and absorb the gases chemically. Thus, it was confirmed that it is possible, by making at least 70% or more of the copper (I) sites three-oxygen-coordinated copper (I) sites, to increase the gas absorbing capacity of the zeolite, increase the chemical absorption capacity allowing tighter gas absorption, and allow absorption not only of nitrogen and carbon monoxide but also of various low-molecular weight gases such as hydrogen, oxygen, methane and ethane at a temperature in the room temperature region.

The rate of the three-oxygen-coordinated copper (I) sites in the copper (I) sites can be determined by calculating the absorbed molar amount of nitrogen to the absorbed molar amount of carbon monoxide in the copper ion-exchanged ZSM-5 zeolite.

The oxygen coordination state of the copper (I) site can be determined by analysis of its emission spectrum. The copper (I) emission spectrum of an absorbent according to the present invention is shown in FIG. 1, and the emission spectrum of a copper ion-exchanged ZSM-5 zeolite prepared by a conventional method is shown in FIG. 2.

Figure 2:
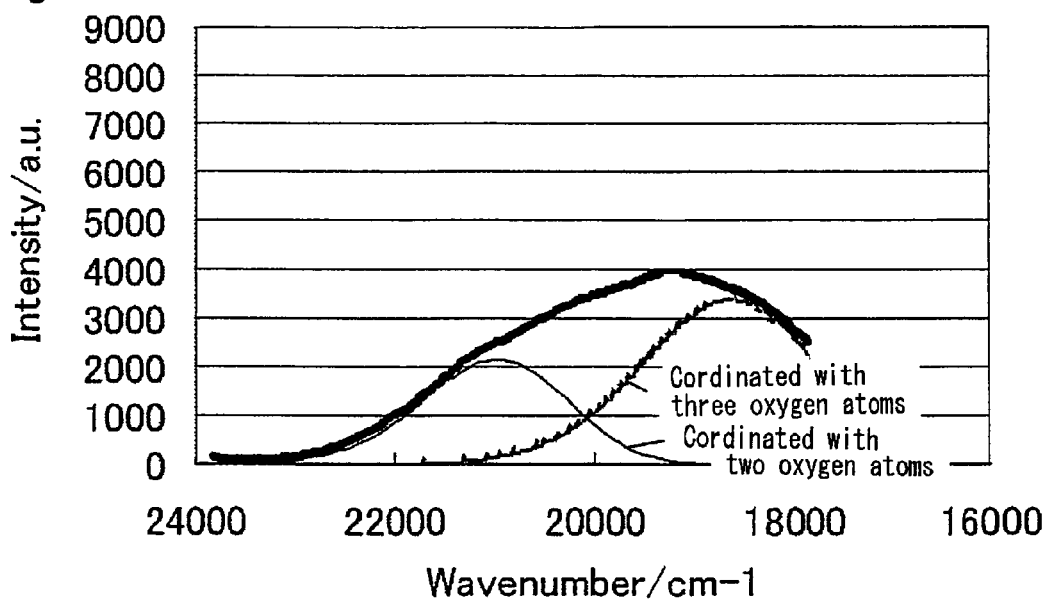
FIG. 2 is a diagram showing the emission spectrum of a copper ion-exchanged ZSM-5 zeolite prepared by a conventional method.

The entire peak spectrum for the copper (I) site is larger and the intensity of the three-oxygen-coordinated peak is distinctively larger in FIG. 1 than in FIG. 2.

The third absorbent according to the invention is characterized in that the copper ion-exchanged ZSM-5 zeolite in the first or second inventions is ion-exchanged by at least an ion exchange solution containing a copper ion and an ion having a buffering action.

According to the present invention, the ion having a buffering action accelerates reduction of the copper ion and increases the rate of the copper (I) site during ion exchange of ZSM-5 zeolite with copper ion, and consequently the absorbed amount of the gas increases.

Also during ion exchange of ZSM-5 zeolite with copper ion, the ion having a buffering action has an action to introduce a copper ion into the three-oxygen-coordinated site, and raises the chemical absorption capacity allowing tighter absorption of gases.

The ion having a buffering action is an ion having an action to buffer the dissociation equilibrium of a solution containing copper ion.

For example, the behavior of ionic dissociation in an aqueous copper acetate solution is show in Formula 1.

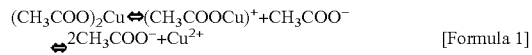

[Formula 1]

Addition of an anion having a suitable buffering action such as the following compound to the system,

[Formula 2]

leads the equilibrium to shift toward central Formula, giving a monovalent ion including species associated with acetate ion:

[Formula 3]

which, in turn, obviously leads to increase in the rate of copper (I) sites and the rate of the three-oxygen-coordinated copper (I) sites.

Although the reasons are yet to be understood, it is probably because of the position of the ion-exchange sites active in nitrogen absorption, the shape selectivity caused by the relationship between the micropore diameter and the ionic diameter, and the specificity caused by the three-dimensional structures thereof.

The fourth absorbent according to the present invention is characterized in that the copper ion in the third absorbent is derived from a carboxylate-containing compound.

According to the present invention, it was possible to increase the rate of the copper (I) sites and consequently to increase the amount of gas absorbed. It was also possible to raise incorporation of three-oxygen-coordinated sites and thus to raise the chemical absorption capacity allowing tighter absorption of gases.

Apparently, it is because the carboxylate-containing compound, which has a suitable coordination bonding efficiency, can generate a species associating with copper (I).

The carboxylate-containing compound is, for example, copper acetate, copper propionate, copper formate, or the like.

The fifth absorbent according to the present invention is characterized in that the carboxylate-containing compound in the fourth invention is copper acetate.

Among carboxylate-containing compounds, copper acetate has a favorable ionic size, leading to easier ion exchange, and is superior in exchange efficiency over repeated use, leading to simplification of the production process. It is also easily produced industrially, and inexpensive.

The sixth absorbent according to the present invention is characterized in that the ion having a buffering action in any one of the third to fifth absorbent is an anion having an ionic size of 5 Å or more and 10 Å or less.

According to the present invention, it is possible to increase the rate of the copper (I) sites and thus increase the amount of the gas absorbed, because the ion having a buffering action accelerates reduction of copper ion effectively.

It is also possible to increase the chemical absorption capacity, allowing tighter absorption of gases, because the ion having a buffering action also has an action to introduce the copper ion into the three-oxygen-coordinated site during ion exchange of ZSM-5 zeolite with copper ion.

Although the reasons are yet to be understood, it is probably because of the shape selectivity caused by the relationship between the micropore diameter of ZSM-5 and the ionic diameter and the specificity caused by the three-dimensional structures thereof. The distance between ZSM-5 openings is 5 Å×7 Å, i.e., a distance that would be favorable for introducing a copper ion into the three-oxygen-coordinated site present in the space, which is considered to be particularly higher in nitrogen absorption capacity.

The seventh absorbent according to the invention is characterized in that the ion having a buffering action described in any one of the third to sixth absorbents is an acetate ion.

According to the present invention, it is possible to raise the rate of the copper (I) sites and thus increase the amount of gases absorbed, because the acetate ion having a buffering action has an action to introduce copper ion into the site easily reducing it into the monovalent state effectively.

It is also possible to raise the chemical absorption capacity allowing tighter absorption of gases further, during ion exchange of ZSM-5 zeolite with copper ion, because the acetate ion having a buffering action has an action to introduce copper ion into the three-oxygen-coordinated site.

The eighth absorbent according to the present invention is characterized in that the ion having a buffering action described in any one of the third to seventh absorbents is an ion derived from ammonium acetate.

According to the present invention, ammonium ion, the counter ion of the acetate ion functioning as a buffer, is decomposed into and removed as ammonia during reduction under heat, leaving no ammonium ion on the ZSM-5 zeolite base substance and no adverse effect on gas absorption.

The ninth absorbent according to the present invention is characterized in that the absorbent described in any one of the first to eighth inventions is prepared by heat treatment under reductive atmosphere.

According to the present invention, it is possible to accelerate copper (I) site formation and increase the amount of gases absorbed further. Carbon monoxide, hydrogen, or an organic gas such as alcohol may be used in preparing the reductive atmosphere.

The heat treatment temperature is preferably in the range of 200° C. to 400° C. A temperature of 400° C. or higher may lead to reduction to metal copper, while a temperature of 200° C. or lower, only to ineffective progress of reduction.

The period of heat treatment under reductive atmosphere is not particularly limited, but heat treatment for 30 minutes to 2 hours was found to be effective in accelerating copper (I) site formation.

The tenth absorbent according to the present invention is characterized in that the absorbent described in any one of the first to ninth inventions gives, by absorption of nitrogen, a peak at around 2295 $cm^{-1}$ identified to be the triple-bond stretching vibration of the nitrogen molecule absorbed on copper (I) ion in the FT-IR spectrum of the absorbent, and the absorbent described in any one of the first to ninth inventions (copper ion-exchanged ZSM-5 zeolite allowing absorption and immobilization of a large volume of nitrogen) in the nitrogen-absorbed state can be identified by the presence of a peak at around 2295 $cm^{-1}$ identifiable as the triple bond stretching vibration of the nitrogen molecule absorbed on the copper (I) ion in the FT-IR spectrum of the absorbent.

Hereinafter, favorable embodiments of the absorbent according to the present invention will be described with reference to drawings. However, it should be understood that the present invention is not restricted by these embodiments.

(Embodiment 1)

Figure 3:
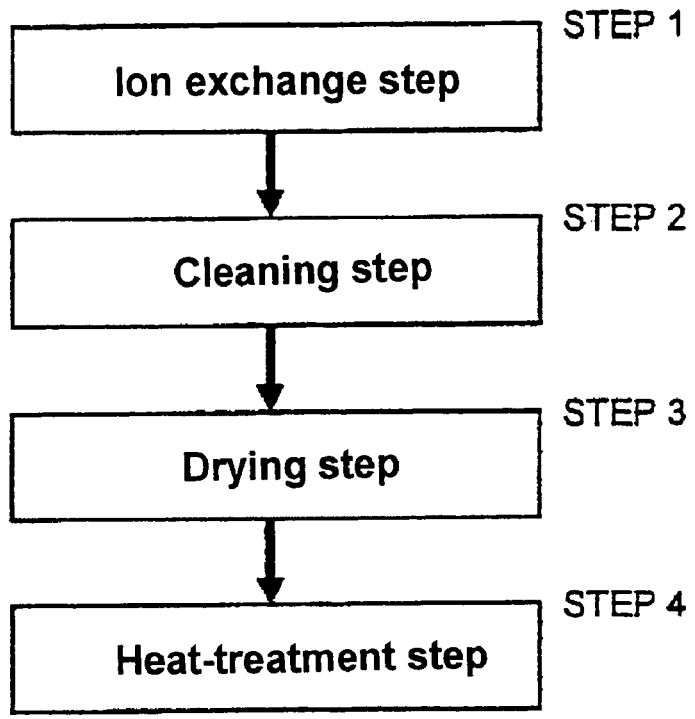
FIG. 3 is a flowchart showing the procedures of preparing the absorbent in embodiment 1 of the present invention.

FIG. 3 is a flowchart showing the procedures of preparing an absorbent of ZSM-5 zeolite ion-exchanged with copper ion in the embodiment 1 of the present invention.

In the present embodiment of the invention, the method of producing an absorbent of ZSM-5 zeolite ion-exchanged with copper ion includes an ion exchange step by using an ion exchange solution containing copper ion and an ion having a buffering action (STEP 1), a cleaning step of cleaning the copper ion-exchanged ZSM-5 zeolite (STEP 2), a drying step (STEP 3), and a heat-treating step of reducing copper ions (STEP 4).

A commercially available material may be used as raw ZSM-5 zeolite before ion exchange with copper ion, but the ratio of silica to alumina thereof is preferably 2.6 or more and 50 or less. It is because a silica/alumina ratio of over 50 leads to reduction in the amount of the copper ion-exchanged sites and thus in the nitrogen-absorbing capacity, while a ZSM-5 zeolite having a silica/alumina ratio of less than 2.6 is impossible to prepare theoretically.

In the ion exchange step (STEP 1), the aqueous solution of a conventional compound such as copper acetate, copper propionate, or copper chloride may be used as copper ion-containing solution, but copper acetate is favorable for increase in the amount of gases absorbed and for stronger absorption.

An ion having an action to buffer the ionic dissociation equilibrium in the copper ion-containing solution, such as acetate or propionate, may be used as an ion having buffering action.

The ion exchange solution containing copper ion and an ion having a buffering action may be obtained by preparing respective ion-containing solutions and mixing the solutions or by dissolving respective solutes in the same solvent.

The number of ion exchange treatments, the concentrations of the copper ion solution and the buffer solution, the period and the temperature of ion exchange, and others are not particularly limited, but the ion exchange rate is preferable in the range of 70% to 140% for obtaining favorable absorption capacity. It is more preferably in the range of 100% to 130%.

The ion exchange rate above is a calculated value, on the basis of an assumption that a $Cu^{2+}$ ion is exchanged with two $Na^+$ ions, and the calculated rate may be more than 100% when copper is ion-exchanged as a $Cu^+$ ion.

Distilled water is preferably used for cleaning in the cleaning step (STEP 2). In the drying step (STEP 3), the zeolite is preferably dried at a temperature of less than 100° C. and may be dried under reduced pressure at room temperature.

In the heat-treating step (STEP 4), the zeolite is preferably heat-treated under reduced pressure, preferably under conditions of a pressure of less than $10^{-5}$ Pa and a temperature of 500° C. or higher and 800° C. or lower. The heat-treatment period may vary according to the amount of the copper ion-exchanged ZSM-5 zeolite, but should be long enough for complete reduction of the copper ion from bivalent to monovalent. Heat treatment at a temperature of 500° C. or higher and 800° C. or lower is favorable, because reduction to monovalent ion may be incomplete at a temperature lower than 500° C. and the structure of zeolite may be disrupted at a temperature higher than 800° C.

The absorbent of ZSM-5 zeolite ion-exchanged with copper ion thus prepared is an absorbent characterized in that at least 60% or more copper sites in the copper ion-exchanged ZSM-5 zeolite are copper (I) sites and/or at least 70% or more of the copper (I) sites are three-oxygen-coordinated copper (I) sites, and allows absorption and immobilization of gases in an capacity more than that of conventional absorbents. It also allows stronger absorption of the gases.

The results of measuring the gas absorption properties of the absorbents of ZSM-5 zeolite ion-exchanged with copper ion in the present embodiment that are processed with ion exchange solutions containing copper ion and an ion having a buffering action that are different in concentration and ion exchange number are shown in Examples 1 to 4. The silica/alumina ratio of the ZSM-5 zeolites used was 11.9, and the heat treatment was conducted at 600° C. for 4 hours. The zeolite prepared in a conventional process in Comparative Example 1 was used as the comparative sample.

EXAMPLE 1

Copper acetate and ammonium acetate were used for preparation of an ion exchange solution containing copper ion and an ion having a buffering action. A copper ion-exchanged ZSM-5 zeolite was prepared by ion-exchanging the zeolite 30 times repeatedly at normal temperature by using a solution obtained by mixing 0.03 M copper acetate solution and 0.03 M ammonium acetate solution at a mixing rate of 1:0.1.

After heat treatment, the zeolite was cooled to 25° C., and the nitrogen-absorbing property thereof was evaluated, to show a nitrogen absorption capacity of 13.0 cc/g at 13,200 Pa and 8.2 cc/g at 10 Pa.

The rate of the copper (I) sites among the copper sites in the copper ion-exchanged ZSM-5 zeolite of the present Example was 92%, and the rate of the three-oxygen-coordinated copper (I) sites among the copper (I) sites was 84%. The ion exchange rate was 130%.

The nitrogen absorption capacity was larger by 2.2 cc/g at 13,200 Pa and 3.6 cc/g at 10 Pa than that in Comparative Example 1. Apparently, there was stronger absorption in the low pressure region. It is because of the increase in the numbers of copper (I) sites and the three-oxygen-coordinated copper (I) sites.

EXAMPLE 2

Copper acetate and ammonium acetate were used for preparation of an ion exchange solution containing copper ion and an ion having a buffering action. A copper ion-exchanged ZSM-5 zeolite was prepared by ion-exchanging the zeolite 30 times repeatedly at normal-temperature by using a solution prepared by mixing 0.01 M copper acetate solution and 0.01 M ammonium acetate solution at a mixing rate of 1:0.1.

After heat treatment, the zeolite was cooled to 25° C., and the nitrogen-absorbing property thereof was evaluated, to show a nitrogen absorption capacity of 12.2 cc/g at 13,200 Pa and 8.0 cc/g at 10 Pa.

The rate of the copper (I) sites among the copper sites in the copper ion-exchanged ZSM-5 zeolite of the present Example was 73%, and the rate of the three-oxygen-coordinated copper (I) sites in the copper (I) sites was 89%. The ion exchange rate was 130%.

The nitrogen absorption capacity was larger by 1.4 cc/g at 13,200 Pa and 3.4 cc/g at 10 Pa than that in Comparative Example 1. Apparently, there was stronger absorption in the low pressure region. It is because of the increase in the numbers of copper (I) sites and the three-oxygen-coordinated copper (I) sites.

EXAMPLE 3

Copper acetate and ammonium acetate were used for preparation of an ion exchange solution containing copper ion and an ion having a buffering action. A copper ion-exchanged ZSM-5 zeolite was prepared by ion-exchanging the zeolite 30 times repeatedly at normal temperature by using a solution prepared by mixing 0.01 M copper acetate solution and 0.01 M ammonium acetate solution at a mixing rate of 1:0.5.

After heat treatment, the zeolite was cooled to 25° C., and the nitrogen-absorbing property thereof was evaluated, to show a nitrogen absorption capacity of 11.0 cc/g at 13,200 Pa and 7.6 cc/g at 10 Pa.

The rate of the copper (I) sites in the copper sites in the copper ion-exchanged ZSM-5 zeolite of the present Example was 89%, and the rate of the three-oxygen-coordinated copper (I) sites in the copper (I) sites was 85%. The ion exchange rate was 114%.

The nitrogen absorption capacity was larger by 0.2 cc/g at 13,200 Pa and 3.0 cc/g at 10 Pa than that in Comparative Example 1. Apparently, there was stronger absorption in the low pressure region. It is because of the increase in the numbers of copper (I) sites and the three-oxygen-coordinated copper (I) sites.

EXAMPLE 4

Copper acetate and ammonium acetate were used for preparation of an ion exchange solution containing copper ion and an ion having a buffering action. A copper ion-exchanged ZSM-5 zeolite was prepared by ion-exchanging the zeolite 30 times repeatedly at normal temperature by using a solution prepared by mixing 0.01 M copper acetate solution and 0.01 M ammonium acetate solution at a mixing rate of 1:1.

After heat treatment, the zeolite was cooled to 25° C., and the nitrogen-absorbing property thereof was evaluated, to show a nitrogen absorption capacity of 11.3 cc/g at 13,200 Pa and 6.6 cc/g at 10 Pa.

The rate of the copper (I) sites in the copper sites of the copper ion-exchanged ZSM-5 zeolite of the present Example was 88%, and the rate of the three-oxygen-coordinated copper (I) sites in the copper (I) sites was 85%. The ion exchange rate was 109%.

The nitrogen absorption capacity was larger by 0.5 cc/g at 13,200 Pa and 2.0 cc/g at 10 Pa than that in Comparative Example 1. Apparently, there was strong absorption in the low pressure region. It is because of the increase in the numbers of copper (I) sites and the three-oxygen-coordinated copper (I) sites.

(Embodiment 2)

Figure 4:
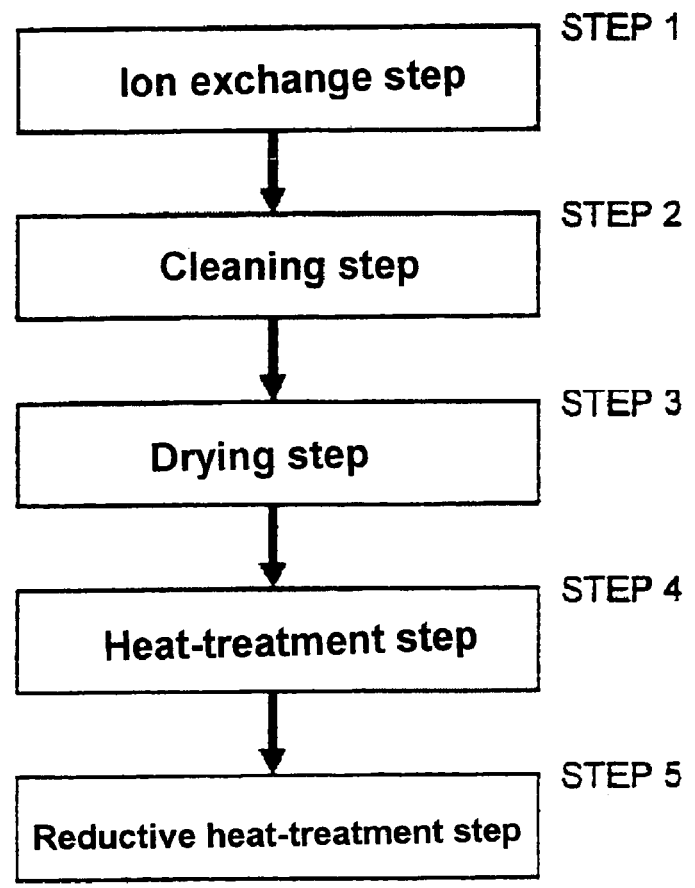
FIG. 4 is a flowchart showing the procedures of preparing the absorbent in embodiment 2 of the present invention.

FIG. 4 is a flowchart showing procedures of preparing an absorbent of ZSM-5 zeolite ion-exchanged with copper ion in embodiment 2 of the present invention.

The method of producing an absorbent of ZSM-5 zeolite ion-exchanged with copper ion according to the present invention includes an ion exchange step by using an ion exchange solution containing copper ion and an ion having a buffering action (STEP 1), a cleaning step of cleaning the copper ion-exchanged ZSM-5 zeolite (STEP 2), a drying step (STEP 3), a heat-treating step of reducing copper ions (STEP 4), and a reductive heat-treating step for acceleration of reduction to monovalent ion (STEP 5).

In the reductive heat-treatment step, reduction of copper ion to monovalent ion is accelerated by heat treatment under reductive atmosphere for improvement in the amount of gases absorbed; carbon monoxide, hydrogen, or an organic gas such as alcohol may be used for preparing the reductive atmosphere; and the heat treatment temperature is favorably at 200° C. to 400° C.

An example of the absorbent of ZSM-5 zeolite ion-exchanged with copper ion in the present embodiment is shown in Example 5. The heat treatment was performed at 600° C. for 4 hours.

EXAMPLE 5

Copper acetate and ammonium acetate were used for preparation of an ion exchange solution containing copper ion and an ion having a buffering action. A copper ion-exchanged ZSM-5 zeolite was prepared by ion-exchanging the zeolite 30 times repeatedly at normal temperature by using a solution prepared by mixing 0.01 M copper acetate solution and 0.01 M ammonium acetate solution at a mixing rate of 1:0.1. After heat treatment, the zeolite was subjected to reductive heat treatment at 400° C. under carbon monoxide atmosphere for 1 hour.

After reductive heat treatment, the zeolite was cooled to 25° C., and the nitrogen-absorbing property thereof was evaluated, to show a nitrogen absorption capacity of 12.6 cc/g at 13,200 Pa and 8.2 cc/g at 10 Pa.

The rate of the copper (I) sites in the copper sites of the copper ion-exchanged ZSM-5 zeolite of the present Example was 82%, and the rate of the three-oxygen-coordinated copper (I) sites in the copper (I) sites was 85%. The ion exchange rate was 89%.

The nitrogen absorption capacity was larger by 1.8 cc/g at 13,200 Pa and 3.6 cc/g at 10 Pa than that in Comparative Example 1.

The nitrogen absorption capacity was increased by the reduction heat treatment, by 0.4 cc/g at 13,200 Pa and 0.2 cc/g at 10 Pa, compared with that of the zeolite of Example 2 prepared under the same conditions.

Hereinafter, a Comparative Example for the absorbent according to the present invention will be described.

COMPARATIVE EXAMPLE 1

An aqueous copper acetate solution was used as an ion exchange solution, for ion exchange in the conventional process described in Patent Document 4. The concentration of the aqueous copper acetate solution was 0.01 M. and the raw ZSM-5 zeolite was ion-exchanged 30 times at normal temperature, to give a copper ion-exchanged ZSM-5 zeolite. The heat treatment was performed similarly to Example 5.

After heat treatment, the zeolite was cooled to 25° C., and the nitrogen-absorbing property thereof was evaluated, to show a nitrogen absorption capacity of 10.8 cc/g at 13,200 Pa and 4.6 cc/g at 10 Pa.

59% of the copper sites in the copper ion-exchanged ZSM-5 zeolite of the present Example were copper (I) sites, and 64% of the copper (I) sites were three-oxygen-coordinated copper (I) sites. The ion exchange rate was 121%.

COMPARATIVE EXAMPLE 2

An aqueous copper chloride solution was used as an ion exchange solution for ion exchange in a conventional process. The concentration of the aqueous copper chloride solution was 0.01 M, and the raw ZSM-5 zeolite was ion-exchanged 20 times at 90° C., to give a copper ion-exchanged ZSM-5 zeolite. The heat treatment was performed similarly to Example 5.

After heat treatment, the zeolite was cooled to 25° C., and the nitrogen-absorbing property thereof was evaluated, to show a nitrogen absorption capacity of 5.3 cc/g at 13,200 Pa and 2.0 cc/g at 10 Pa.

55% of the copper sites in the copper ion-exchanged ZSM-5 zeolite of the present Example were copper (I) sites, and 65% of the copper (I) sites were three-oxygen-coordinated copper (I) sites. The ion exchange rate was 111%.

The results in Examples 1 to 5 and the results in Comparative Examples 1 and 2 are summarized in the following Table 1.

TABLE 1

|  | Example 1 | Example 2 | Example 3 | Example 4 | Example 5 | Comparative Example 1 | Comparative Example 2 |
|---|---|---|---|---|---|---|---|
| Ion exchange solution | Copper acetate and ammonnium acetate | | | | | Copper acetate | Copper chloride |
| Ion exchange rate [%] | 130 | 130 | 114 | 109 | 89 | 121 | 111 |
| Reductive heat-treatment step | None | None | None | None | Yes | None | None |
| Rate of copper (I)sites [%] | 92 | 73 | 89 | 88 | 82 | 59 | 55 |
| Rate of three-oxygen-coordinated copper (I) sites in copper (I) sites [%] | 84 | 89 | 85 | 85 | 85 | 64 | 65 |
| Nitrogen absorption capacity at 13,299 Pa [cc/g] | 13.0 | 12.2 | 11.0 | 11.3 | 12.6 | 10.8 | 5.3 |
| Nitrogen absorption capacity at 10 Pa [cc/g] | 8.2 | 8.0 | 7.6 | 6.6 | 8.2 | 4.6 | 2.0 |

The zeolites obtained in Examples 1 to 5, wherein 60% or more of the copper sites in the copper ion-exchanged ZSM-5 zeolite are copper (I) sites as shown in Table 1, were found to increase in its nitrogen absorption capacity, compared to those obtained in Comparative Example 1 or 2 wherein the copper (I) site rate is less than 60%.

In addition, the zeolites obtained in Examples 1 to 5, wherein 70% or more of the copper (I) sites are three-oxygen-coordinated copper (I) sites, were found to increase in its nitrogen absorption capacity, compared to those obtained in Comparative Example 1 or 2 wherein the three-oxygen-coordinated copper (I) site rate is less than 70%.

Comparison between Examples 2 and 5 reveals that the reductive heat-treatment step was effective in increasing the nitrogen absorption capacity.

The copper ion-exchanged ZSM-5 zeolites obtained in Examples 1 to 5, which were prepared by ion exchange with an ion exchange solution containing a copper ion derived from the carboxylate-containing compound copper acetate and an acetate ion derived from ammonium acetate having a buffer action and having an ionic size of 5 Å or more and 10 Å or less, were improved in nitrogen absorption capacity from the zeolites prepared in comparative Examples 1 and 2.

Industrial Applicability

As described above, the absorbent according to the present invention absorbs a gas in a greater amount than conventional available products. The absorbent, which absorbs nitrogen, oxygen, hydrogen and others and has a particularly high absorption capacity toward nitrogen, can be used in various fields, for example for removal of gas in fluorescent lamp, removal of a trace amount of gas in rare gas, and gas separation.

The invention claimed is:

1. An absorbent of ZSM-5 zeolite ion-exchanged with copper ion, wherein at least 73% of all copper sites in the ion-exchanged ZSM-5 zeolite are copper (I) sites, and wherein at least 84% of the copper (I) sites are three-oxygen-coordinated copper (I) sites.

2. The absorbent according to claim 1, wherein the copper ion-exchanged ZSM-5 zeolite is ion-exchanged with an ion exchange solution containing at least copper acetate and ammonium acetate.

* * * * *